US009801344B1

(12) United States Patent
Lehan

(10) Patent No.: US 9,801,344 B1
(45) Date of Patent: Oct. 31, 2017

(54) WHITE CAP REMOVAL UNIT FOR A GRAIN CLEANER

(71) Applicant: Oleksandr Lehan, Ramsey, MN (US)

(72) Inventor: Oleksandr Lehan, Ramsey, MN (US)

( * ) Notice: Subject to any disclaimer, the term of this patent is extended or adjusted under 35 U.S.C. 154(b) by 0 days.

(21) Appl. No.: 15/188,543

(22) Filed: Jun. 21, 2016

(51) Int. Cl.
*B07B 1/00* (2006.01)
*A01F 12/42* (2006.01)
*A01F 12/44* (2006.01)

(52) U.S. Cl.
CPC ............ *A01F 12/42* (2013.01); *A01F 12/446* (2013.01)

(58) Field of Classification Search
CPC .. B07B 1/46; B07B 4/025; B07B 4/04; B07B 1/30; B07B 4/08; B02B 1/02; A01F 11/06
USPC .............................. 209/245; 55/385.1, 385.3
See application file for complete search history.

(56) References Cited

U.S. PATENT DOCUMENTS 1,419,437 A * 6/1922 Angers ..................... B07B 4/04 193/27
1,593,447 A * 7/1926 Friedman .............. F24B 15/007 209/348
2,100,738 A * 11/1937 Frevert ................... B07B 4/025 209/146
2,174,322 A * 9/1939 Hatfield ..................... B07B 1/30 209/318
2,422,399 A * 6/1947 Erickson ................. A01F 11/06 209/26
3,349,910 A * 10/1967 Loken ........................ B02B 1/02 209/245
3,455,451 A * 7/1969 Smith, Jr. ................ B03D 1/24 209/164
3,948,764 A * 4/1976 Edwards ................... B07B 1/46 209/250
4,222,866 A * 9/1980 Wilson .................... A24F 19/00 209/257
D263,836 S * 4/1982 Read ............................ D15/147
5,875,978 A * 3/1999 Wingler ..................... B02C 7/11 241/259.1
5,927,509 A * 7/1999 Lord ......................... B03B 5/02 209/44
9,233,397 B1 * 1/2016 Johnson ..................... B07B 1/04

FOREIGN PATENT DOCUMENTS

CN 202238608 U * 5/2012 ............... B07B 1/22
CN 205851340 U * 1/2017 ............... B07B 1/28
CN 206005150 U * 3/2017 ............... A01C 7/10

* cited by examiner

*Primary Examiner* — Arpad Fabian-Kovacs
(74) *Attorney, Agent, or Firm* — Dave Alan Lingbeck

(57) ABSTRACT

A white cap removal unit for a grain cleaner for eliminating multiple steps otherwise necessary to properly clean grains. The white cap removal unit for a grain cleaner includes a separator assembly including a grain receiver having a side wall, an open top, an open bottom, an open side and a passageway extending therethrough, and also including a planar mesh screen removably disposed in the passageway for removing white cap from grain.

7 Claims, 4 Drawing Sheets

WHITE CAP REMOVAL UNIT FOR A GRAIN CLEANER

BACKGROUND OF THE INVENTION

Field of the Invention

The present invention relates to grain cleaners and more particularly pertains to a new white cap removal unit for a grain cleaner for eliminating multiple steps otherwise necessary to properly clean grains.

Description of the Prior Art

The use of grain cleaners are known in the prior art. More specifically, grain cleaners heretofore devised and utilized are known to consist basically of familiar, expected and obvious structural configurations, notwithstanding the myriad of designs encompassed by the crowded prior art which have been developed for the fulfillment of countless objectives and requirements.

The prior art includes an indent cylinder assembly which includes a removable cylinder. The cylinder is removed by unwrapping it from around a frame. The grain cleaner also includes at least some augers with drop away troughs. The grain cleaner also includes grain cleaning assemblies such as, for example, indent cylinders and rotary screen drums and/or grain cleaning assemblies drive systems which are mounted on framework members capable of pivoting outwardly from the machine allowing access to machinery and components positioned centrally within the grain cleaner. Another prior art includes a grain processor for separating and measuring components of a sample of grain as it passes through a rotary sieve having two or more sieving sections having different perforations so that selective separation is made on the basis of the size of the particles in the sample. A single rotatable drum presents a substantially continuous screen surface of increasing mesh size from one end to another with the drum having an inlet end and an outlet end. Also another prior art includes a plurality of baffles disposed in spaced apart relationship along the periphery of and along the length of the screen surface of the drum for retarding the flow of material therethrough. Retaining means is provided in the vicinity of the outlet end of the drum for retarding the flow of foreign material from the drum while accommodating the eventual passage of foreign material out of the drum. The drum is rotated by any conventional power source. While these devices fulfill their respective, particular objectives and requirements, the aforementioned patents do not disclose a new white cap removal unit for a grain cleaner.

SUMMARY OF THE INVENTION

The general purpose of the present invention, which will be described subsequently in greater detail, is to provide a new white cap removal unit for a grain cleaner which has many of the advantages of the grain cleaners mentioned heretofore and many novel features that result in a new white cap removal unit for a grain cleaner which is not anticipated, rendered obvious, suggested, or even implied by any of the prior art grain cleaners, either alone or in any combination thereof. The present invention includes a separator assembly including a grain receiver having a side wall, an open top, an open bottom, an open side and a passageway extending therethrough, and also including a planar mesh screen removably disposed in the passageway for removing white cap from grain.

None of the prior art includes the combination of the elements of the present invention.

There has thus been outlined, rather broadly, the more important features of the white cap removal unit for a grain cleaner in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new white cap removal unit for a grain cleaner which has many of the advantages of the grain cleaners mentioned heretofore and many novel features that result in a new white cap removal unit for a grain cleaner which is not anticipated, rendered obvious, suggested, or even implied by any of the prior art grain cleaners, either alone or in any combination thereof.

Still another object of the present invention is to provide a new white cap removal unit for a grain cleaner for eliminating multiple steps otherwise necessary to properly clean grains.

Still yet another object of the present invention is to provide a new white cap removal unit for a grain cleaner that allows the user to load all grains to be cleaned into one unit without having to load the grains into separate units to first remove the white caps.

Even still another object of the present invention is to provide a new white cap removal unit for a grain cleaner that can be easily and conveniently changed or adapted to clean grains directly or remove the white caps first before cleaning the grain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
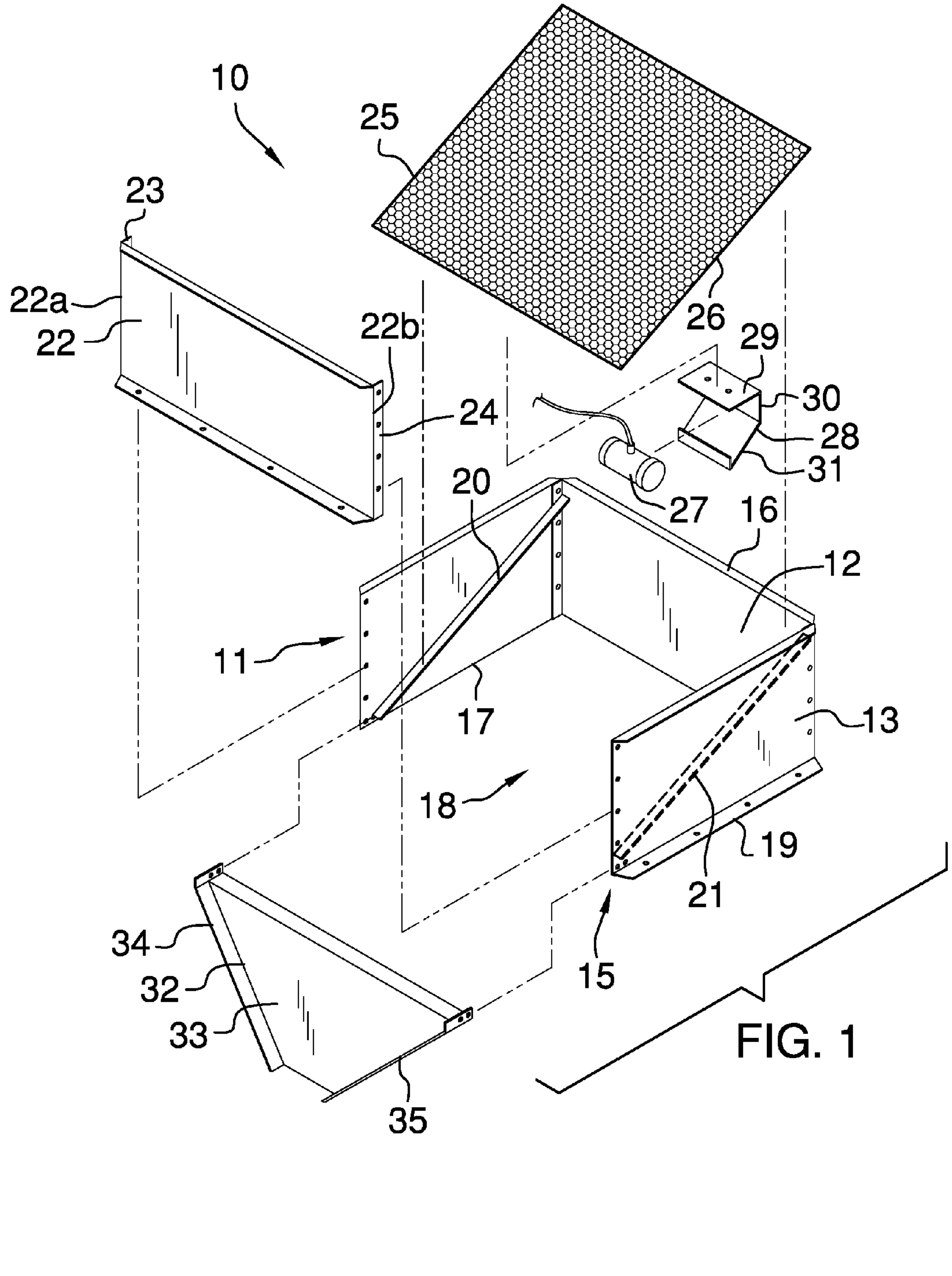
FIG. 1 is an exploded top perspective view of a white cap removal unit for a unit of a new white cap removal unit for a grain cleaner according to the present invention.

With reference now to the drawings, and in particular to FIGS. 1 through 4 thereof, a new white cap removal unit for a grain cleaner embodying the principles and concepts of the present invention and generally designated by the reference numeral 10 will be described.

As best illustrated in FIGS. 1 through 4, the white cap removal unit for a grain cleaner 10 may generally comprise a separator assembly 11 including a grain receiver 12 having a side wall 13, an open top 14, an open bottom 15, an open side 18 and a passageway 48 extending therethrough, and may also include a planar mesh screen 25 removably disposed in the passageway 48 for removing white cap from grain. The separator assembly 11 may also include an agitator 27 which includes a motor energized by a conventional power source such as an electrical outlet with the agitator 27 conventionally coupled to the mesh screen 25 for vibrating the mesh screen 25 to remove the white cap from the grain with the grain passing through the mesh screen 25 and the open bottom 15. The planar mesh screen 25 may have a bottom side 26 with the agitator 27 conventionally fastened to the bottom side 26 of the mesh screen 25. The separator assembly 11 may also include a shield 28 conventionally attached to the bottom side 26 of the mesh screen 25 and disposed about the agitator 27. The shield 28 may have a proximate end portion 29 conventionally coupled to the bottom side 26 of the mesh screen 25 adjacent to the agitator 27 and may also have an intermediate portion 30 extending downwardly perpendicular to the mesh screen 25 and may further have a distal end portion 31 angled relative to the intermediate portion 30 and disposed beneath the agitator 27.

As illustrated in FIGS. 1 through 4, the separator assembly 11 may further include a gate 22 movably disposed in the open side 18 to open and close the open side 18 and to allow the white cap to gravitationally move out of the grain receiver 12. The gate 22 may have side edges 22*a*, 22*b* with side flanges 23, 24 conventionally disposed along a length of the side edges 22*a*, 22*b* and fastenable to the side wall 13 to secure the gate 22 in a closed position or at least in a partially open position in the open side 18 of the grain receiver 12.

Figure 2:
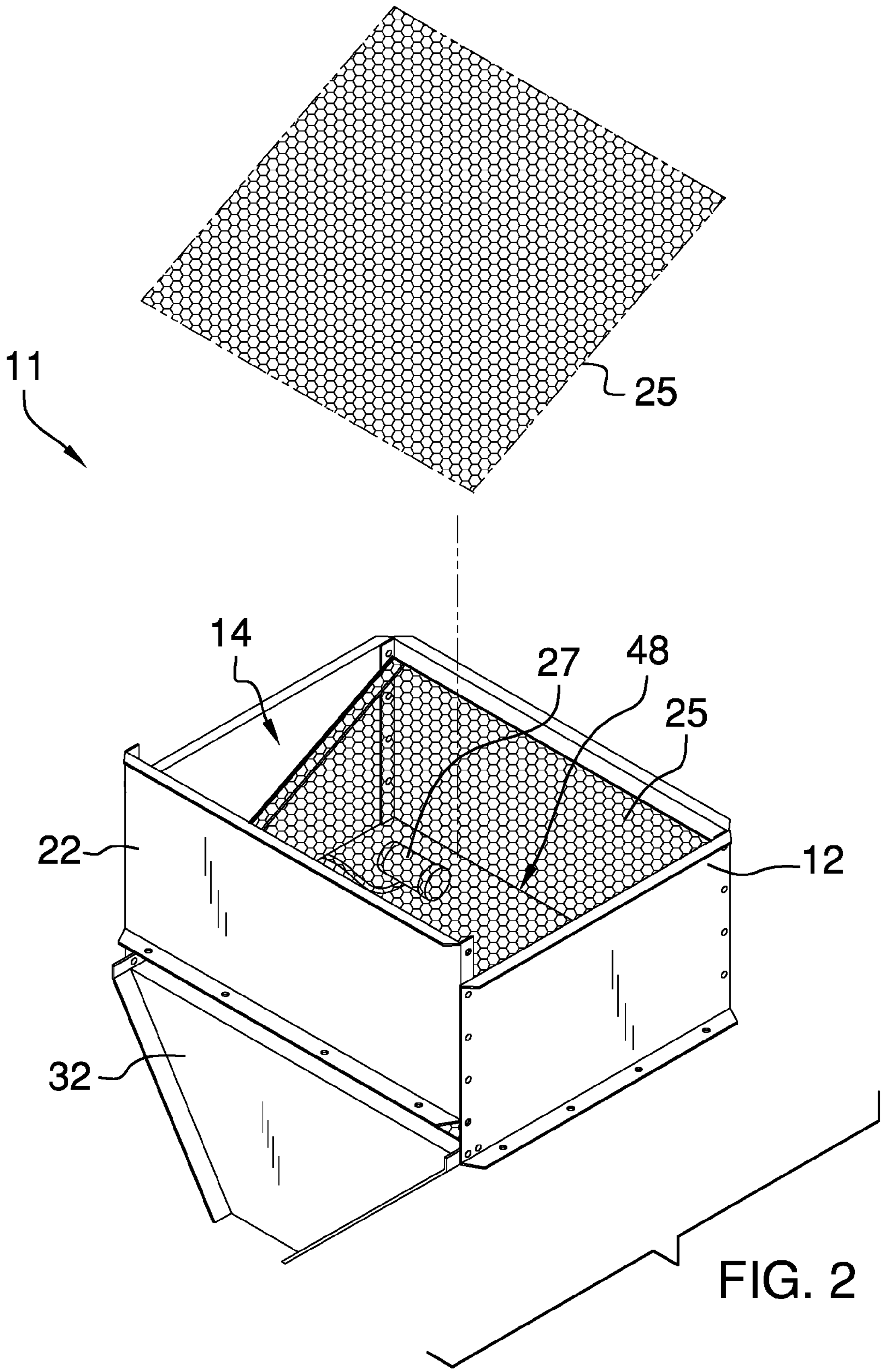
FIG. 2 is a top perspective view of the white cap removal unit for a unit of the present invention.

As shown in FIGS. 1 and 2, the separator assembly 11 may include rigid elongate support strips 20, 21 forming ledges and disposed in the passageway 48 of the grain receiver 12 and conventionally attached to the side wall 13. The mesh screen 25 may be removably supported upon the elongate support strips 20, 21. The side wall 13 may have top and bottom edges 16, 17 with longitudinal axes of the elongate support strips 20, 21 angled relative to the top and bottom edges 16, 17 of the side wall 13. The elongate support strips 20, 21 may be slanted downwardly from near the top edge 16 to the bottom edge 17 towards the open side 18 with the mesh screen 25 slanted downwardly towards the open side 18 when removably disposed in the grain receiver 12 and upon the elongate support strips 20, 21 to facilitate gravitationally moving the white cap out of the grain receiver 12.

As illustrated in FIG. 1 through 4, the separator assembly 11 may further include a chute 32 disposed below the open side 18 and depending from the grain receiver 12. The chute 32 may have a slide 33 with upturned sides 34, 35. Each of the upturned sides 34, 35 may be conventionally coupled along the bottom edge 17 of the side wall 13 of the grain receiver 12. The chute 32 includes a housing 36 having side walls 37, 38, first and second end walls 40, 41 and an open top 39. the first and second end walls 40, 41 are coupled along the bottom edge 17 of the side wall 13 of the grain receiver 12. The first end wall 40 is a slide which is slanted downwardly towards the second end wall 41, wherein the second end wall 41 has a bottom end portion 42 with an opening 43 disposed therethrough to allow the white cap to exit the housing 36.

Figure 3:
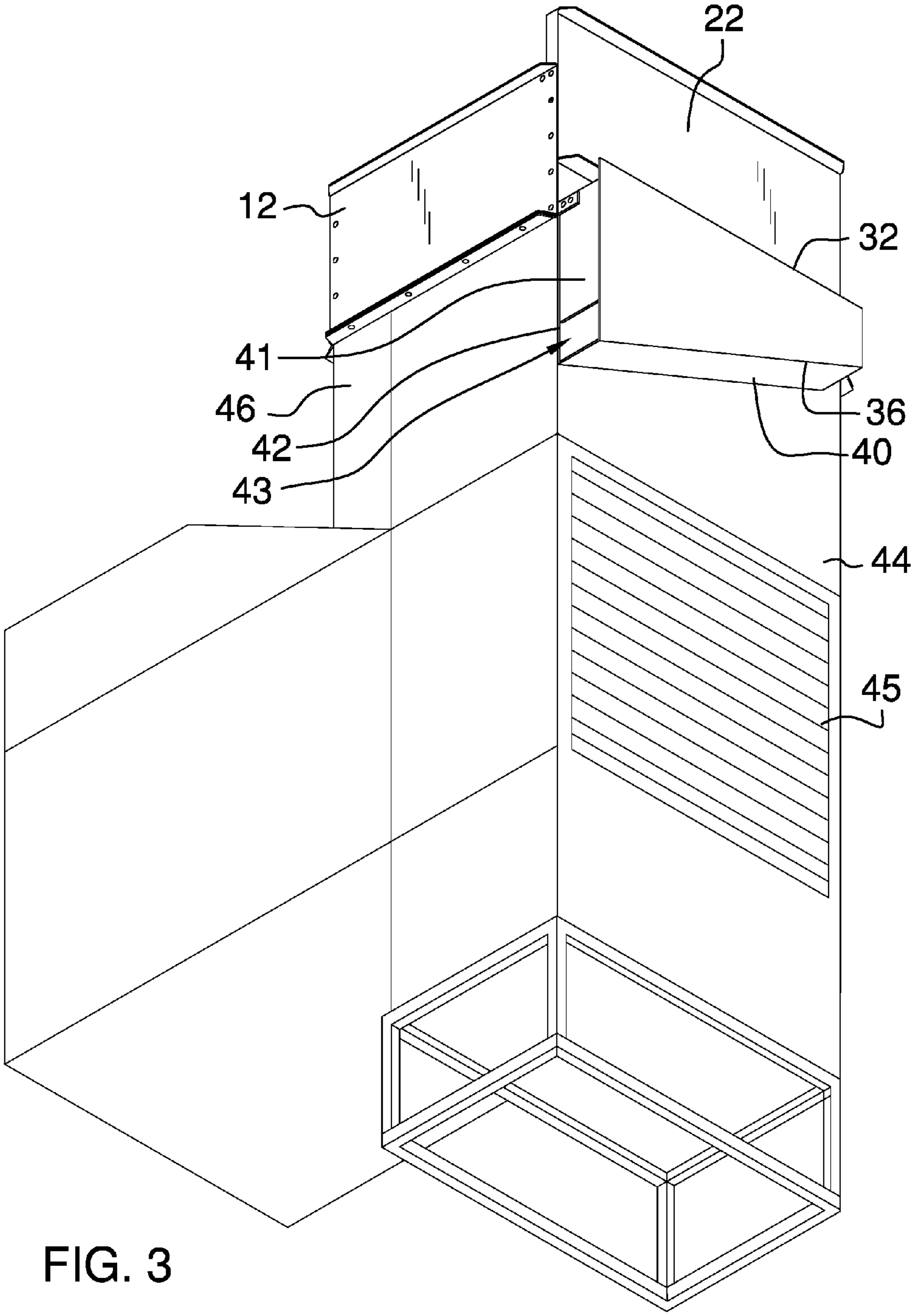
FIG. 3 is a bottom perspective view of a second embodiment of the present invention.
Figure 4:
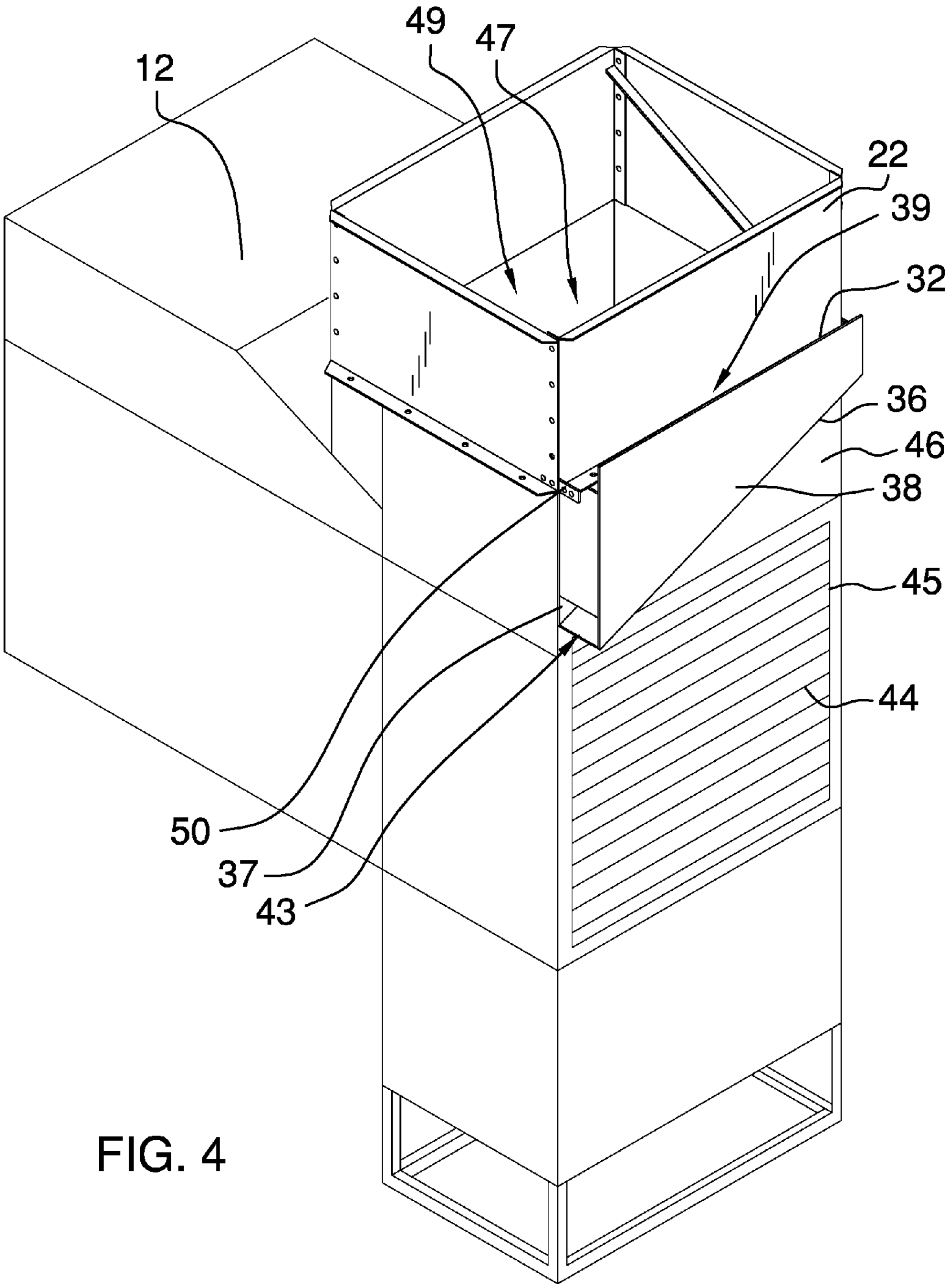
FIG. 4 is a top perspective view of the second embodiment of the present invention.

As shown in FIGS. 3 and 4, the white cap removal unit for a grain cleaner 10 may further include a grain cleaner 44 having a housing member 45 with a hopper section 46 forming a top portion of the housing member 45 and having an open top 47 for receiving grain and a channel 49 disposed therethrough. The grain receiver 12 may be conventionally coupled upon the hopper section 46 with the passageway 48 vertically aligned with the channel 49. The grain receiver 12 may have a bottom flange 19 conventionally and integrally disposed along the bottom edge 17 of the side wall 13. The bottom flange 19 may be conventionally fastened upon and along a top edge 50 of the hopper section 47 of the grain cleaner 44 to secure the grain receiver 12 to the housing member 45. The chute 32 depending from the grain receiver 12 may be disposed adjacent to and alongside the hopper section 46.

In use, grain is loaded into the grain receiver 12 and dispensed through the grain receiver 12 into the grain cleaner 44. The mesh screen 25 may be inserted in a passageway 48 of the grain receiver 12 and the grain may be loaded upon the mesh screen 25 and the agitator 27 may be conventionally energized, which vibrates the mesh screen 27 and the vibration removes the white cap from the grain. The white cap from the grain receiver 12 may be gravitationally removed down the chute 32 with the grain passing through the mesh screen 25 into the grain cleaner 44.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the white cap removal unit for a grain cleaner. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A white cap removal unit for a grain cleaner comprising a separator assembly including a grain receiver having a side wall, an open top, an open bottom, an open side and a passageway extending therethrough, and also including a planar mesh screen removably disposed in the passageway for removing white cap from grain, wherein the separator assembly also includes an agitator fastened to the mesh screen for vibrating the mesh screen to remove the white cap from the grain with the grain passing through the mesh screen and the open bottom, wherein the planar mesh screen has a bottom side with the agitator fastened to the bottom side of the mesh screen, wherein the separator assembly also includes a shield attached to the bottom side of the mesh screen and disposed about the agitator.

2. The white cap removal unit for a grain cleaner as described in claim 1, wherein the shield has a proximate end portion coupled to the bottom side of the mesh screen adjacent to the agitator and also has an intermediate portion extending downwardly perpendicular to the mesh screen and further has a distal end portion angled relative to the intermediate portion and disposed beneath the agitator.

3. A white cap removal unit for a grain cleaner comprising a separator assembly including a grain receiver having a side wall, an open top, an open bottom, an open side and a passageway extending therethrough, and also including a planar mesh screen removably disposed in the passageway for removing white cap from grain, wherein the separator assembly includes rigid elongate support strips forming ledges and disposed in the passageway of the grain receiver and attached to the side wall, wherein the mesh screen is removably supported upon the elongate support strips.

4. The white cap removal unit for a grain cleaner as described in claim 3, wherein the side wall has top and bottom edges with longitudinal axes of the elongate support strips angled relative to the top and bottom edges of the side wall.

5. The white cap removal unit for a grain cleaner as described in claim 4, wherein the elongate support strips are slanted downwardly from near the top edge to the bottom edge towards the open side with the mesh screen slanted downwardly towards the open side when removably disposed in the grain receiver and upon the elongate support strips to facilitate gravitationally moving the white cap out of the grain receiver.

6. A method of using a white cap removal unit for a grain cleaner comprising the steps of:

providing a grain cleaner, a grain receiver disposed upon the grain cleaner, a mesh screen, an agitator fastened to the mesh screen, and a chute coupled to the grain receiver;

inserting the mesh screen in a passageway of the grain receiver; loading grain into the grain receiver and upon the mesh screen and energizing the agitator which vibrates the mesh screen and removes the white cap from the grain; and dispensing grain through the grain receiver into the grain cleaner.

7. The method of using the white cap removal unit for the grain cleaner as described in claim 6 includes removing the white cap from the grain receiver through the chute with the grain passing through the mesh screen into the grain cleaner.

* * * * *